United States Patent [19]
Martin et al.

[11] Patent Number: 6,149,094
[45] Date of Patent: *Nov. 21, 2000

[54] SPRING MOTOR

[75] Inventors: Dennis W. Martin, Bristol, Conn.; Tariq M. Afzal, Westland, Mich.

[73] Assignee: Barnes Group Inc., Bristol, Conn.

[*] Notice: Under 35 U.S.C. 154(b), the term of this patent shall be extended for 307 days.

[21] Appl. No.: 08/618,593

[22] Filed: Mar. 20, 1996

[51] Int. Cl.$^7$ .............................. B65H 75/48; E06B 9/30; E05F 11/00

[52] U.S. Cl. ..................... 242/373; 242/375; 242/375.3; 160/168.1 P; 160/192; 185/39; 185/45

[58] Field of Search .................................... 242/373, 375, 242/375.3; 160/168.1 P, 192; 185/39, 45

[56] References Cited

U.S. PATENT DOCUMENTS

| | | | |
|---|---|---|---|
| 3,194,343 | 7/1965 | Sindlinger | 185/39 X |
| 3,216,529 | 11/1965 | Lohr | 185/39 |
| 4,427,163 | 1/1984 | Kondziola | 185/37 X |
| 5,482,100 | 1/1996 | Kuhar | 160/170 |

*Primary Examiner*—John Q. Nguyen
*Attorney, Agent, or Firm*—Vickers, Daniels & Young

[57] ABSTRACT

A motor for controlling the elevating and lowering of a load comprises a storage drum, an output drum and a spring member operatively connected therebetween to provide a spring motor therewith, and a pair of cord drums aligned with and respectively adjacent the storage drum and the output drum. A gear train including an idler gear associated with the storage drum drivingly interengages the cord drums with the output drum, whereby the elevating and lowering of a load attached to the cords on the cord drums is balanced regardless of whether the elevating or lowering force is applied centrally between the points of attachment of the cords to the load.

45 Claims, 5 Drawing Sheets

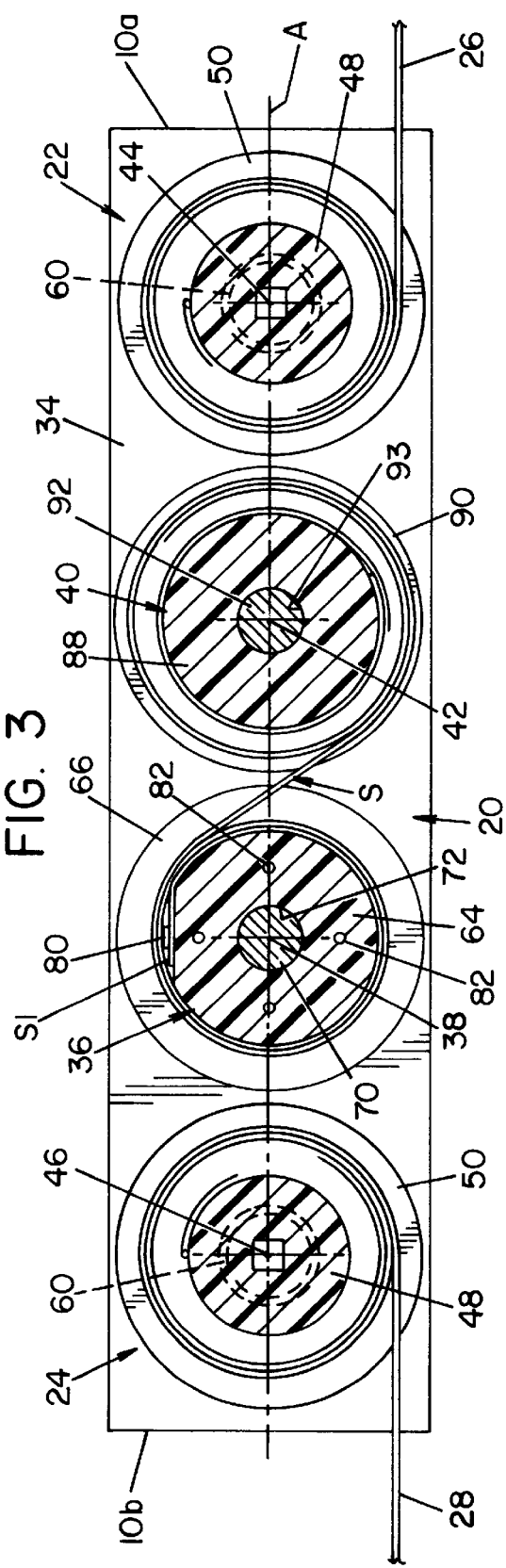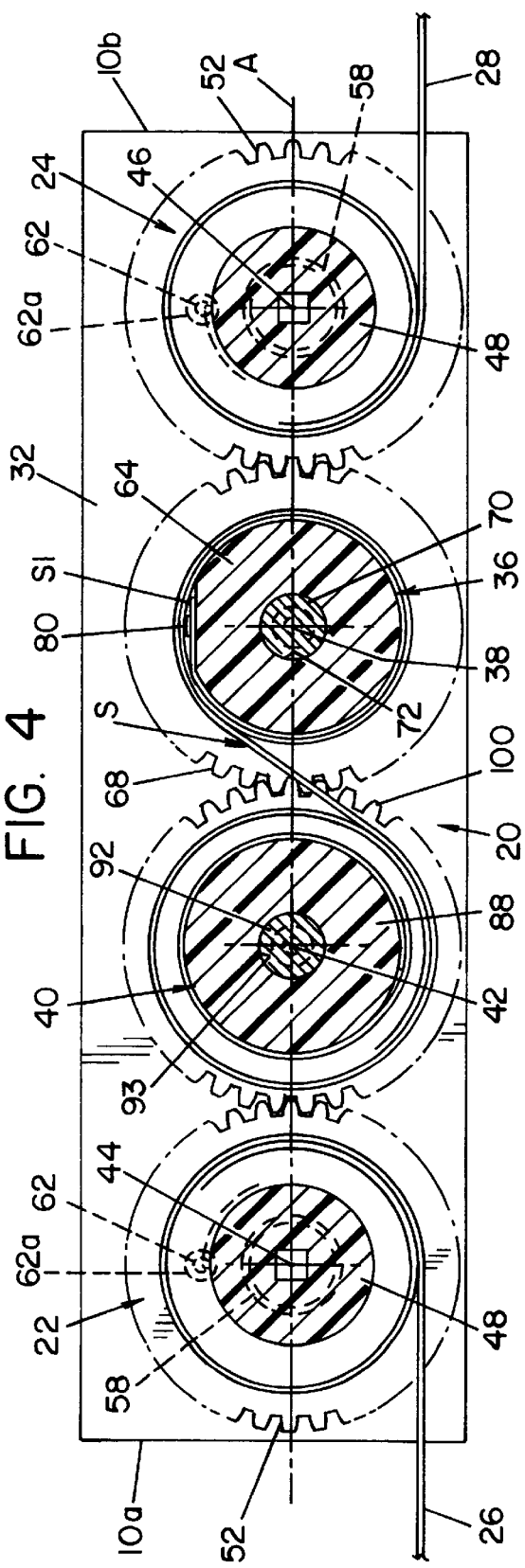

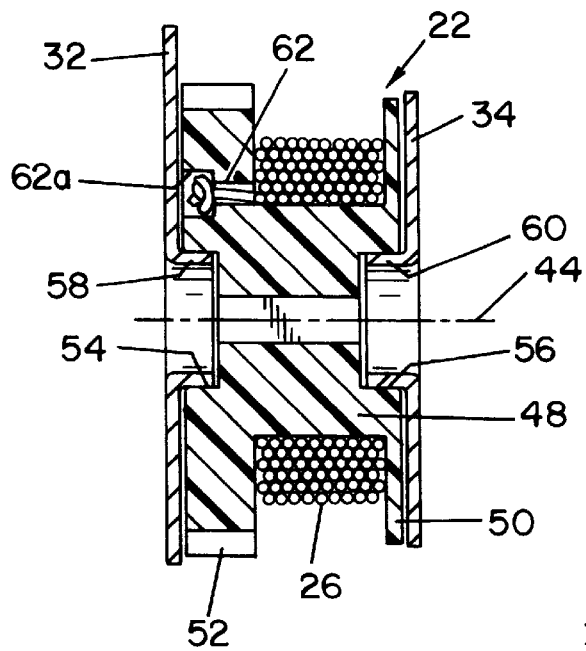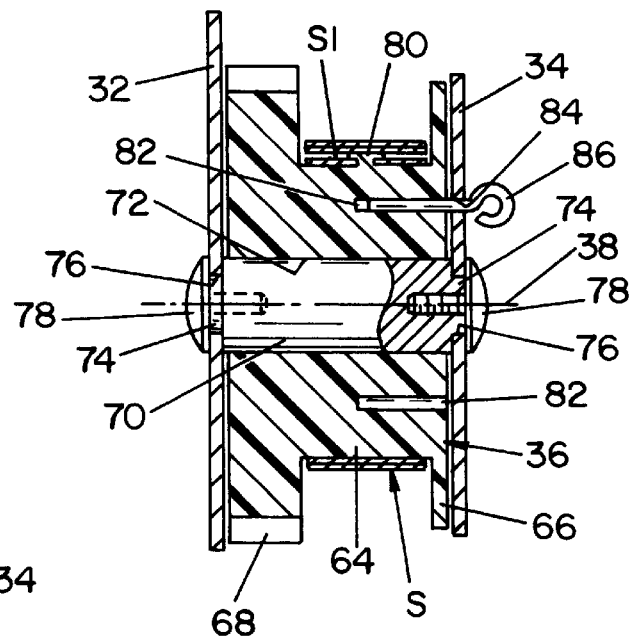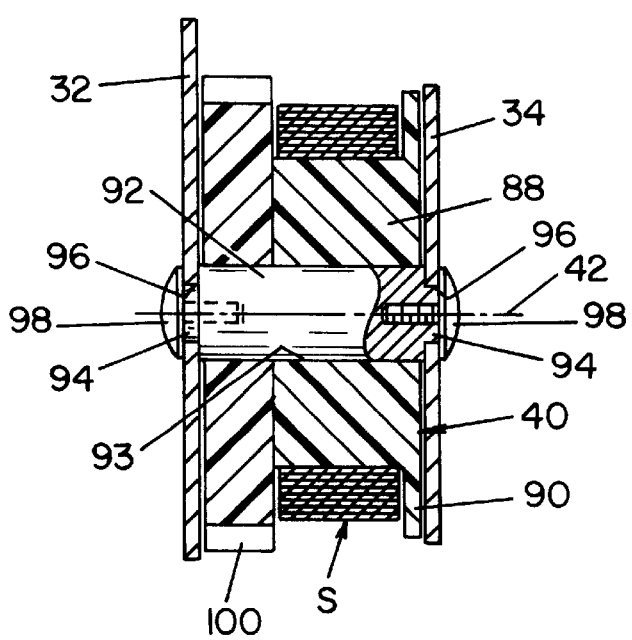

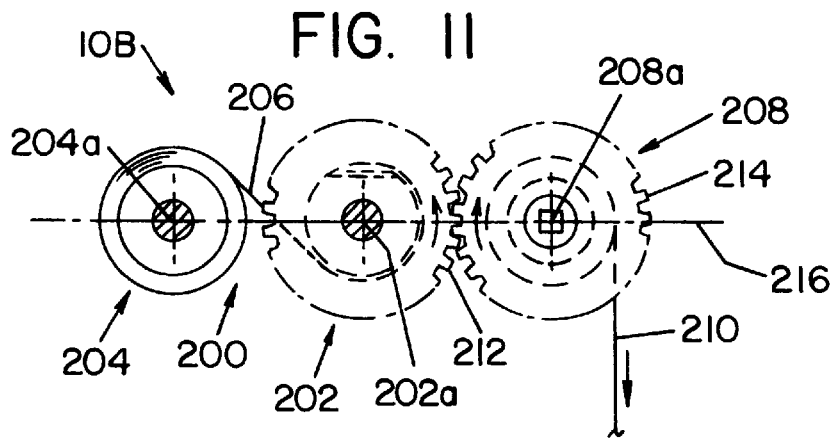
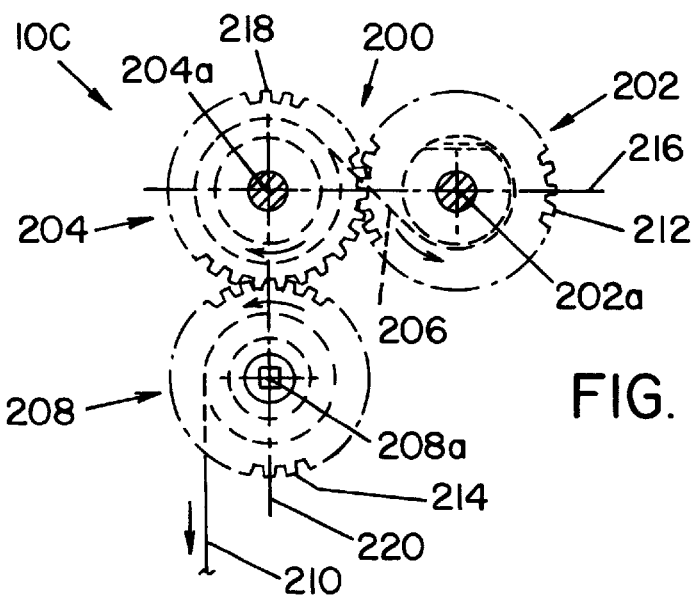
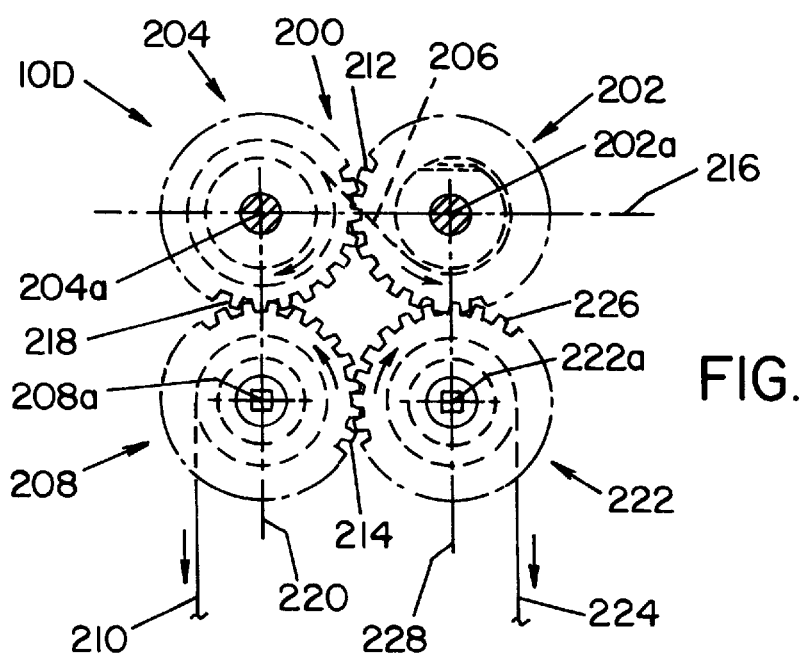

SPRING MOTOR

BACKGROUND OF THE INVENTION

This invention relates to the art of spring motors and, more particularly, to improvements in connection with the size and operation of spring motors.

Spring motors according to the present invention have improved size and operating characteristics whereby the spring motors find particular utility in conjunction with assisting the elevating and lowering of a variable load such as that provided by a venetian blind type window covering. Accordingly, the invention is illustrated and described herein in connection with a variable load of the foregoing character. At the same time, however, and as will become apparent, spring motors in accordance with the present invention are advantageously operable in conjunction with controlling the displacement of variable loads other than that provided by a venetian blind and, moreover, are advantageously operable in conjunction with assisting or controlling the displacement of uniform loads.

Spring motors of the character to which the present invention is directed are well known and comprise a flat ribbon of spring metal which is prestressed and coiled so as to have a natural or relaxed state in which the spring forms a tightly wound coil disposed on or in a storage or takeup drum. The free end of the coil is attached to the hub of an output or drive drum onto which the spring is backwound by rotating the output drum in a direction to backwind the spring thereon. When the holding force or load by which the spring is backwound on the output drum is released, the curling property of the spring rewinds the latter onto or into the storage drum toward its natural or relaxed state. As is well known, the spring member in such spring motors can be of constant or variable force, depending upon the intended use for the motor. As is further well known, a variable force characteristic can be attained in a number of ways including tapering the thickness and/or width of the spring member between its opposite ends and/or varying the radius of curvature of the spring member along the length thereof.

Spring motors of the foregoing character are used in a variety of applications where it is desired to control the force required to displace a load or object between extended and retracted positions relative to a location at which the spring motor is fixed. Such uses include the unwinding and rewinding of a motor vehicle seat belt as shown, for example, in U.S. Pat. No. 4,429,840 to Chawla et al., and the elevating end lowering of a load supported in suspension such as shown, for example, in U.S. Pat. No. 5,020,032 to Dale et al. In the foregoing and other applications, a control drum which is coaxial with the output drum is attached thereto for rotation therewith, and a belt or cord is wound onto the control drum in a direction which provides for the unwinding of the belt or cord relative to the control drum to rotate the output drum in the direction for winding the spring member thereonto from the storage drum. When the force required for such unwinding is relaxed, the spring member returns to its natural coiled condition whereupon the output drum is rotated by the spring member in the direction to rewind the cord or belt onto the control drum. In conjunction with elevating and lowering a load such as the base or bottom rail and slats of a venetian blind, two cords can be wound on the control drum in opposite directions with the free ends of the cords attached adjacent the opposite ends of the base rail. When the rail is lowered, the two cords unwind from the control drum thus driving the output drum to wind the spring member thereon. Upward displacement of the rail from a lowered position results in the spring member rewinding relative to the storage drum to rotate the output drum and thus the control drum in the direction to rewind the two cords thereunto. In elevating and lowering a suspended load of the foregoing character which is too heavy to provide desired displacement characteristics in connection with the elevating and lowering thereof using a single spring motor, and as an alternative to providing a larger spring motor for the latter purpose, two spring motors of a given size can be operated in unison and each of the two cords can be wound on the control drum of a corresponding one of the two motors.

Spring motors of the foregoing character have a number of disadvantages, none the least of which is the lack of versatility with respect to designing control arrangements which optimize location of the control drum or other control member relative to the spring motor in conjunction with parameters such as space requirements and spring motor location in connection with a particular intended use for the spring motor. For example in this respect, the control drum is coaxial with the output drum of the spring motor thus adding to the space requirement for the spring motor in the direction of the drum axes. In connection with elevating and lowering a load such as a venetian blind wherein the spring motor is mounted in the head rail of the blind with the drum axes perpendicular to the window, coaxial mounting of the cord drum with the drive drum of the spring motor increases the width requirement for the head rail perpendicular to the window at least by the axial width of the cord drum. This not only requires use of additional material in constructing the head rail but also can affect the aesthetics of the venetian blind assembly, especially where the latter is of the miniblind type wherein the slats are relatively narrow and it is desirable to provide for the width of the head rail to correspond as closely as possible thereto. Further disadvantage resides in the fact that the required mounting of the cord drum or other control drum on the drive drum of the spring motor precludes any selectivity with respect to positional orientation between the control drum and drive drum and, thus, the ability to construct a spring motor or an arrangement of spring motors to operate in unison without particular concern for the location of the control drum relative to the drive drum of a single spring motor or the drive drums of a plurality of such motors arranged to operate in unison. Still further, in conjunction with operating a plurality of spring motors in unison for elevating and lowering a load such as a venetian blind through the use of a pair of cords, prior art spring motor arrangements do not provide for a desired even motion between the component parts of the several motors and, accordingly, do not provide a desired balance with respect to elevating and lowering the load in the absence of the elevating and lowering control force being equally applied to both cords.

SUMMARY OF THE INVENTION

A motor in accordance with the present invention, comprising storage and output drums and a spring member operatively connected therebetween to provide a spring motor therewith, includes a control arrangement by which rotation of the output drum is controlled in a manner which overcomes the foregoing and other disadvantages attendant to the use of spring motors heretofore available. More particularly in this respect, the control arrangement in accordance with the present invention is laterally aligned with the output and storage drums of the spring motor and is either directly or indirectly drivingly interengaged with the output drum for controlling rotation of the latter with respect to the winding and unwinding of the spring member thereon during operation of the motor. In either case, the control arrangement is such that the motor has a width in the direction of the storage and output drum axes basically corresponding to the axial dimensions of the storage and output drums, whereby the width of the motor in the direction of the drum axes is minimized.

In accordance with one aspect of the invention, the control arrangement includes a control drum rotatable about an axis parallel to and spaced from the output and storage drum axes, and the control drum is either directly or indirectly drivably interengaged with the output drum so as to control the rotation of the latter in connection with the winding and unwinding of the spring member thereon. In connection with a single spring motor, direct driving interengagement can be achieved by aligned, interengaging gears on the output and control drums. Alternatively, an indirect drive of the output drum can be achieved by a gear train including an idler gear coaxial with the storage drum and which is directly driven by the control drum.

In accordance with another aspect of the invention, a single spring motor or a plurality of spring motors interconnected for operation in unison, can be provided with two control drums to facilitate displacement of a load relative to the motor through two flexible lines or cords respectively wound about one and the other of the control drums. In this instance, with regard to a single spring motor, a first one of the control drums is directly drivingly interengaged with the output drum of the spring motor such as through gears therebetween, and the second control drum is indirectly drivably interengaged with the output drum through a gear on the second control drum and an idler gear coaxial with the storage drum. In an arrangement of a plurality of spring motors in series with one another for operation in unison, one of the control drums is directly drivingly interengaged with the output drum of a first motor in the series, and the other control drum is indirectly drivingly interengaged with the output drum of the last motor in the series in the manner described for a single motor. Further, the output drum of the spring motor or motors between the first and last motors in the series are drivingly interconnected with the output drums of the first and last motors. Preferably, such driving interengagement between the component parts of a motor or motors in the foregoing arrangements is achieved by a gear train including gears on and rotatable with the control drums and output drums, and idler gears coaxial with and rotatable relative to the storage drums.

The drivingly interengaged relationship between a pair of control drums and one or more spring motors associated therewith advantageously provides for even motion between the component parts and the balanced displacement of a load supported between the control drum lines, even if the controlling force on the two lines is not equal. In connection with elevating and lowering a venetian blind, for example, the drivingly interengaged relationship provides for the uniform application of spring force in both directions of operation of the spring motor and thus uniform motion of all moving parts to assure balanced lowering and elevating of the blind with respect to maintaining the base rail of the blind horizontal. Furthermore, the drivingly interengaging arrangement which is preferably provided by a gear train promotes minimizing the width of the motor axially of the control, output, and storage drums while providing the foregoing desirable operating characteristics.

It is accordingly an outstanding object of the present of the present invention to provide improved arrangements for controlling rotation of the output drum of a spring motor in connection with the displacement of a load between extended and retracted positions relative to the spring motor.

Another object is the provision of a motor of the foregoing character wherein the control arrangement is aligned with the output and storage drums of the spring motor transverse to the axes thereof, whereby the width of the motor in the direction of the axes of the output and storage drums of the spring motor is minimized.

A further object is the provision of a motor of the foregoing character wherein the control arrangement can be selectively positioned relative to the output and storage drums of a spring motor and directly and/or indirectly drivingly interengaged with the output drum.

Still another object is the provision of a motor of the foregoing character wherein the control arrangement provides for uniform motion between all of the moving parts thereof, thus assuring balanced displacement of a load both in the extending and retracting thereof relative to the spring motor.

Still a further object is the provision of a motor of the foregoing character in which the control arrangement includes a pair of control drums for controlling rotation of the output drum of a spring motor or a plurality of spring motors through a gear train including gears on the control and output drums and an idler gear coaxial with the storage drum of each spring motor.

Yet another object is the provision of a motor of the foregoing character wherein the control drums have a flexible control line or cord wound thereon the free ends of which are connected to a common load to be elevated and lowered relative to the motor, such as the base and slats of a venetian blind, and wherein the control arrangement provides for the balanced elevating and lowering of the load independent of the application of an equal control force to each of the ends of the control lines connected to the load.

Still a further object is the provision of a motor of the foregoing character which is structurally simple, structurally compact, has considerable versatility with respect to design parameters, and which is highly efficient in operation in connection with controlling the displacement of a load relative thereto.

BRIEF DESCRIPTIONS OF THE DRAWINGS

The foregoing objects, and others, will in part be obvious and in part pointed out more fully hereinafter in conjunction with the written description of preferred embodiments of the invention illustrated in the accompanying drawings in which:

FIG. 3 is a sectional elevation view of the motor taken along line 3—3 in FIG. 2;

FIG. 4 is a sectional elevation view of the motor taken along line 4—4 in FIG. 2;

FIG. 5 is a cross-sectional elevation view of a control drum of the motor taken along line 5—5 in FIG. 2;

FIG. 6 is a cross-sectional elevation view of the output drum of the motor taken along line 6—6 in FIG. 2;

FIG. 7 is a cross-sectional elevation view of the storage drum of the motor taken along line 7—7 in FIG. 2;

FIG. 11 is a front elevation view schematically illustrating another embodiment of a motor in accordance with the present invention;

FIG. 12 is a front elevation view schematically illustrating yet another embodiment of a motor according to the invention; and FIG. 13 is a front elevation view schematically illustrating still another embodiment of a motor in accordance with the invention.

DESCRIPTION OF PREFERRED EMBODIMENTS

Figure 1:
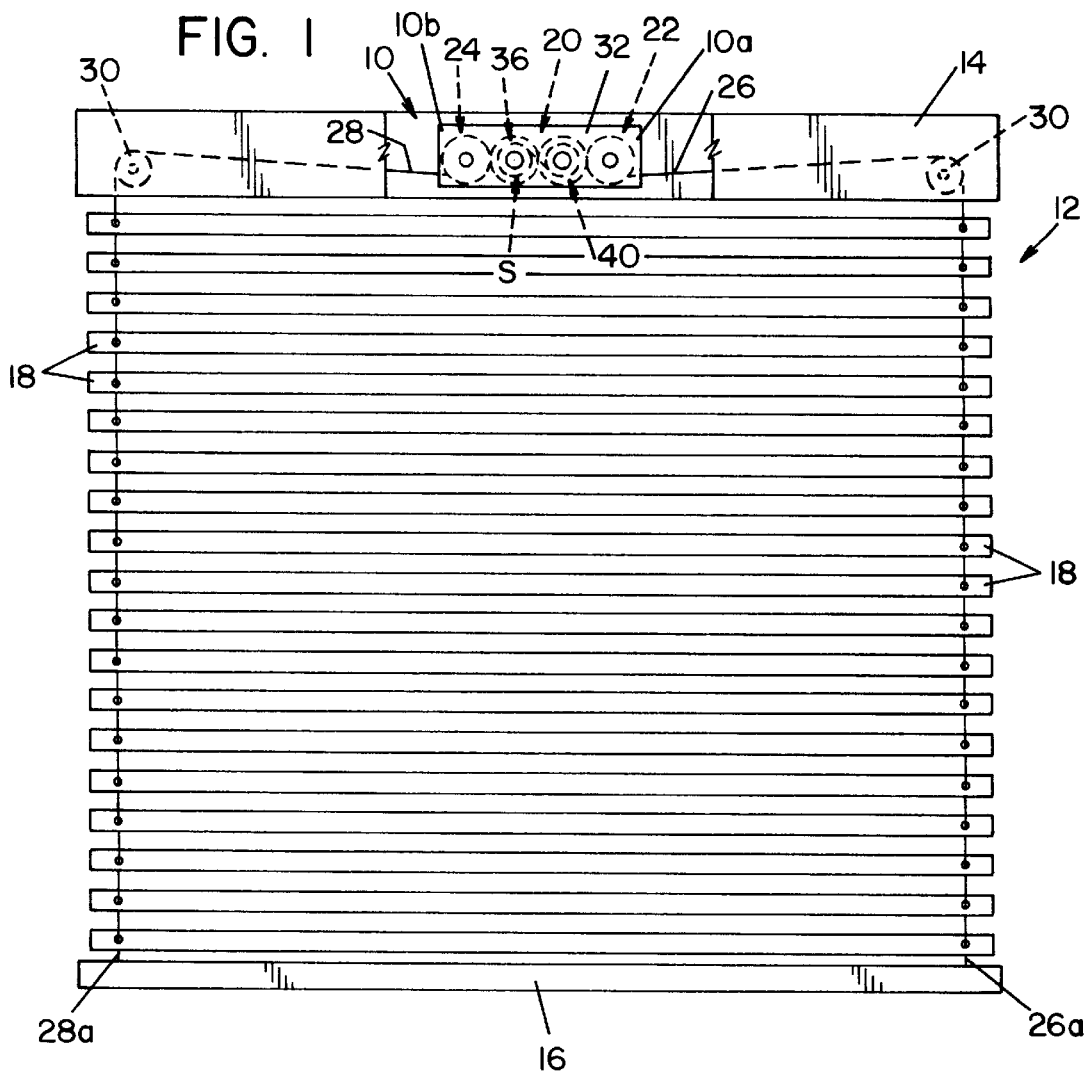
FIG. 1 is a front elevation view schematically illustrating a motor in accordance with the present invention operatively associated with a Venetian blind.
Figure 2:
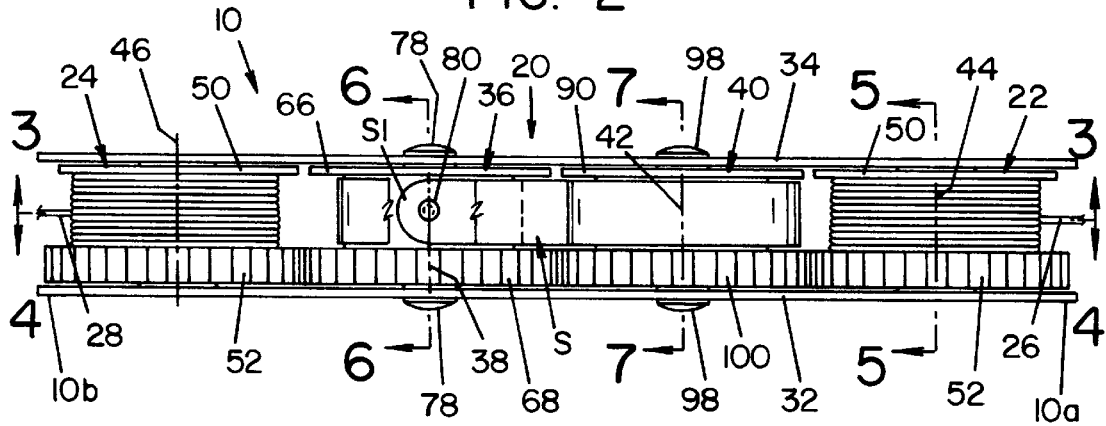
FIG. 2 is a plane view of the motor illustrated in FIG. 1.

Referring now in greater detail to the drawings, wherein the showings are for the purpose of illustrating preferred embodiments of the invention only and not for the purpose of limiting the invention, FIG. 1 somewhat schematically illustrates a motor 10 according to the present invention operatively associated with a venetian blind unit 12 to provide a cordless arrangement for elevating and lowering the blind. More particularly in this respect, the venetian blind unit includes a head rail 14, a base or bottom rail 16, and a plurality of blind slats 18. As is well known and not shown, slats 18 are independently supported from head rail 14 so as to be vertically spaced from one another when base rail 16 is lowered as shown in FIG. 1, and the slats collectively stack upon one another and are supported by base rail 16 when the latter is elevated to its retracted position beneath and closely adjacent to head rail 14. Motor 10 is suitably mounted in head rail 14 and, as will be described in greater detail hereinafter, comprises a spring motor 20 and a control arrangement therefor which includes cord drums 22 and 24 on which flexible cords 26 and 28 are respectively wound. Cords 26 and 28 extend outwardly from the corresponding drum and about corresponding support pulleys 30 and have corresponding free ends 26a and 28a suitably secured to base rail 16 adjacent the opposite ends thereof. Motor 10 in this environment provides a cordless venetian blind in which a minimal manual force applied in opposite directions to base rail 16 provides for elevating and lowering the latter and slats 18 relative to head rail 14.

As best seen in FIGS. 2–7 of the drawing, motor 10 includes front and rear metal support plates 32 and 34, respectively, which provide the motor with longitudinally opposite ends 10a and 10b. As will be described in greater detail hereinafter, spring motor 20 includes an output drum 36 mounted between plates 32 and 34 for rotation about a drum axis 38, a storage drum 40 mounted between plates 32 and 34 for rotation relative thereto about a drum axis 42 transverse to the plates, and control or cord drums 22 and 24 which are respectively mounted adjacent ends 10a and 10b of plates 32 and 34 for rotation about drum axes 44 and 46, respectively. Axes 38, 42, 44 and 46 are transverse to plates 32 and 34, parallel to one another and spaced apart in a common plane A.

The structures of cord drums 22 and 24 are identical, whereby it will be appreciated that the following description of cord drum 22 shown in FIG. 5 is also applicable to cord drum 24. Referring now to FIG. 5, cord drum 22 includes a circular hub 48 having a radially outwardly extending peripheral flange 50 adjacent support plate 34 and a radially outwardly extending toothed drum gear 52 adjacent the inner side of support plate 32. Hub 48 includes axially inwardly extending annular recesses 54 and 56, and the drum is rotatably supported between plates 32 and 34 by respectively staking the plates to provide annular sleeves 58 and 60 extending axially inwardly of the corresponding one of the recesses 54 and 56. Drum gear 52 is provided adjacent hub 48 with an axially extending opening 62 having an enlarged outer end 62a, and the inner end of cord 26 extends axially outwardly through opening 62 and is knotted or otherwise enlarged in outer portion 62a so as to anchor the cord relative to the drum. The cord is then wound about hub 48 between flange 50 and gear 52 to provide a necessary length thereof for operating motor 10 in connection with elevating and lowering the venetian blind. It will be appreciated that cord 28 is attached to and wound about the hub of drum 24 for the same purpose. The direction of winding of cords 26 and 28 on the corresponding drum will become apparent hereinafter.

As will be best appreciated from FIG. 6, output drum 36 of spring motor 20 comprises a hub 64 having a radially outwardly extending peripheral flange 66 adjacent the inner side of support plate 34 and a radially outwardly extending toothed drum gear 68 adjacent the inner side of support plate 32. Drum 36 is mounted between plates 32 and 34 for rotation relative thereto by means of an axle member 70 extending through an opening 72 therefor in hub 64 and which axle provides drum axis 38. The axially opposite ends of axle 70 are provided with projections 74 extending through openings 76 in support plates 32 and 34, and the support plates and axle are securely interengaged by threaded fasteners 78 having threaded shanks extending into threaded openings therefor in axle 70. Spring motor 20 further includes a spring member S which is described hereinafter and which, as is well known, is operatively connected between output drum 36 and storage drum 40 to provide a spring motor therewith. In this respect, spring S has a first end Si staked to hub 64 of output drum 36 and, for this purpose, hub 64 is provided with a radially outwardly extending projection 80 for attaching spring end S1 thereto. As is further well known, when spring S is wound onto output drum 36 from storage drum 40 the spring force tends to rewind spring S onto the storage drum. In order to enable locking of the spring motor in a position in which spring S is partially wound about output drum 36, hub 64 is provided with pairs of diametrically opposed openings 82 extending axially thereinto from the end of the hub adjacent the inner side of support plate 34, and the latter is provided with an opening 84 alignable with each of the openings 82. When aligned, the openings 82 and 84 receive a removable lock pin 86 which interengages output drum 36 with support plate 34 to preclude rotation of the drum relative thereto. The lock pin arrangement advantageously facilitates the mounting of motor 10 in the head rail of a venetian blind and making the necessary connections between cords 26 and 28 and base rail 16 in conjunction with assembly and mounting of the venetian blind.

Referring now to FIG. 7, storage drum 40 includes a circular hub 88 having a radially outwardly extending peripheral flange 90 adjacent the inner side of support plate 34. Hub 88 is mounted between support plates 32 and 34 for rotation relative thereto by a drum axle 92 which provides drum 42 and extends through an opening 93 therefor in hub 88. In a manner similar to that of output drum 36, the axially opposite ends of axle 92 are provided with axially outwardly extending projections 94 which extend through openings 96 provided therefor in support plates 32 and 34, and the axle is securely fastened between plates 32 and 34 by threaded fasteners 98 having threaded shanks interengaging with threaded openings therefor in the axle. Storage drum 40 further includes an idler gear 100 on axle 92 between hub 88 and the inner side of support plate 32. Hub 88 and idler gear 100 are rotatable about axle 92 relative to one another and to support plates 32 and 34.

As will be appreciated from the description of motor 10 thus far, axles 70 and 92 of the output and storage drums maintain support plates 32 and 34 in parallel spaced apart relationship, whereby threaded fasteners 78 and 98 are the only fasteners required to maintain the component parts of the motor in assembled relationship. As will be appreciated from FIGS. 2 and 4, and for the purposes set forth more fully hereinafter, control drum gears 52, output drum gear 68, and storage drum gear 100 are of the same diameter, have the same number of teeth about the peripheries thereof, and are mounted between support plates 32 and 34 in longitudinal alignment and with the gear teeth of each gear in meshing interengagement with the teeth of the longitudinally adjacent gear.

Figure 8:
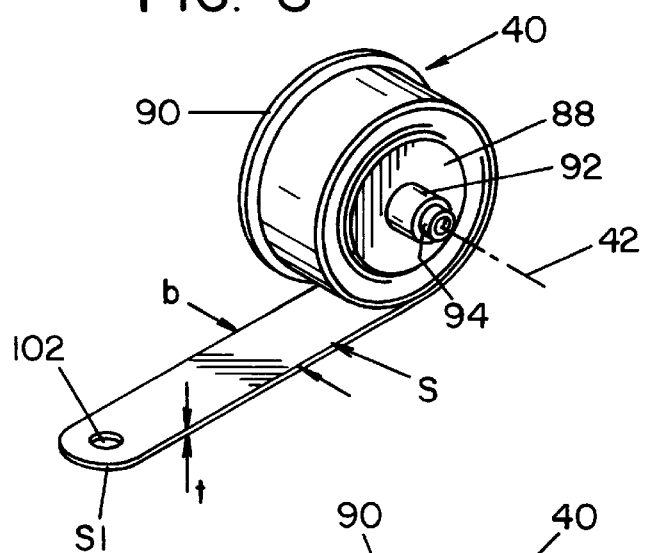
FIG. 8 is a perspective view of a spring member for the spring motor shown wound on the storage drum.
Figure 9:
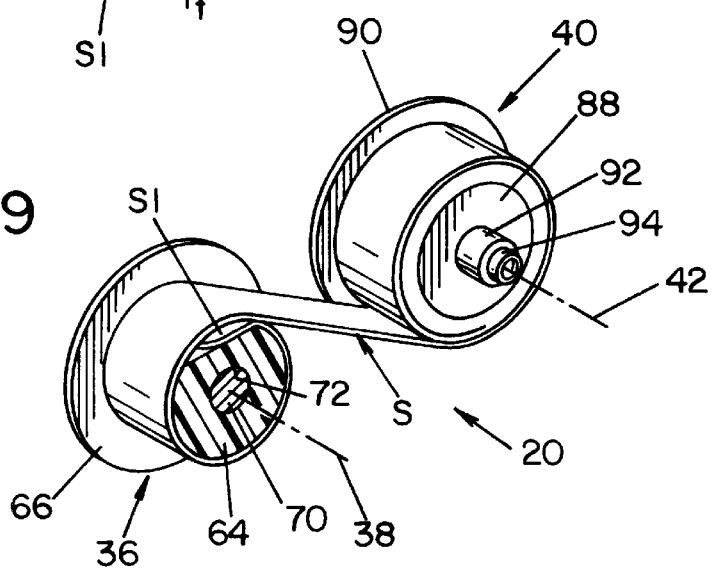
FIG. 9 is a perspective view of the spring member shown partially wound on the storage and output drums.

Referring now to FIGS. 8 and 9 of the drawing, end S1 of spring S has an opening 102 therethrough to accommodate projection 80 on hub 64 of output drum 36 by which end S1 is staked to the latter drum. As is well known, spring S is a prestressed strip of flat spring metal having a natural or relaxed state in which it forms a tightly wound coil which is mounted on but not fastened to the storage drum. End S1 of the spring, as will be appreciated from the orientation shown in FIGS. 3 and 9, is attached to output drum 36 so as to be wound thereabout counter to the relaxed curvature of the spring. Accordingly, as spring S is progressively transferred from storage drum 40 to output drum 36 by rotation of the latter counter clockwise in FIGS. 3 and 9, the spring provides a desired constant or variable resisting force which, upon release of the force causing the counter clockwise rotation of output drum 36, rewinds spring S on storage drum 40. Preferably, in connection with elevating and lowering the venetian blind illustrated in FIG. 1, spring S is a variable force spring in which the return force is greatest when base rail 16 and slats 18 of the venetian blind are in the elevated position thereof immediately beneath head rail 14. In the latter position, as is well known, base rail 16 supports the cumulative weight of slats 18 and thus provides the greatest load in the downward direction on cords 26 and 28 and thus on motor 10. In contrast, when base rail 16 is fully lowered as represented in FIG. 1, slats 18 are supported in suspension from head rail 14, whereby the load imposed on cords 26 and 28 and thus motor 10 is that of base rail 16 alone. The force of spring S is designed in accordance with the size of a given venetian blind unit to facilitate elevating and lowering of base rail 16 with the application of minimal manual force by a person operating the venetian blind. Therefore, it will be appreciated that the variable force characteristic referred to above provides for elevating and lowering the venetian blind with a substantially uniform manual force.

More particularly regarding lowering and elevating of the venetian blind 12, and assuming base rail 16 of the blind to be in its retracted or upper position underlying top rail 14 and supporting the weight of slats 18, spring member S of spring motor 20 in its relaxed or natural state tightly wound on hub 88 of storage drum 40. As will be appreciated from the foregoing description, and with reference to FIG. 3, the load on motor 10 through cords 26 and 28 is the greatest when base rail 16 is so positioned, and the return force tending to wind spring member S onto the storage drum is likewise the highest when the base rail is so positioned. When a person grasps base rail 16 and pulls downwardly thereon, cords 26 and 28 rotate cord drums 22 and 24 counter clockwise and clockwise, respectively, about the corresponding one of the axes 44 and 46. The meshing interengagement of the teeth on cord drum gears 52, idler gear 100, and output drum gear 68 drivingly interengage drum gears 52 with output gear 68, whereby the latter is rotated counter clockwise in FIG. 3 to progressively wind spring member S on to the output drum as base rail 16 is moved downwardly. Further, as mentioned above, the load on motor 10 decreases as base rail 16 moves downwardly and the force of spring member S progressively decreases as the spring member is wound onto output drum 36, whereby the manual downward force required to lower the venetian blind remains substantially constant. Importantly in accordance with the present invention, the intermeshing gears advantageously provide for even or uniform motion of the cord drums and output drum, thus assuring balanced lowering of base rail 16 even if the manual force is not applied directly in the center of the base rail. Thus, for example, if the user pulls downwardly on base rail 16 closer to cord 26 than to cord 28, whereby the cord force is greater on cord drum 22 than cord drum 24, the gear train not only assures the necessary rotation of output drum 36 but also assures that cord drum 24 is rotated uniformly relative to cord drum 22, thus to unwind cord 28 therefrom for maintaining base rail 16 in a horizontal disposition during such lowering. The force characteristic of spring member S is such that the weight of base member 16 and any slats 18 supported thereon at any particular point during lowering of the blind is slightly greater than the return force of the spring member, whereby the base rail is retained at any given point of its extension below head rail 14 against unintentional displacement upwardly to its retracted position.

When it is desired to retract or elevate base rail 16 and slats 18 to their upper position underlying head rail 14, an upward force is manually applied to base rail 16 which removes the load applied on spring motor 20 through cord drum gears 52. Accordingly, the return force of spring member S causes the latter to rewind on storage drum 40, and such rewinding rotates output drum 36 clockwise in FIG. 3. Such rotation of the output drum rotates output drum gear 68 in the same direction whereby the gear train is operable to rotate cord drum gears 52 of cord drums 22 and 24 clockwise and counter clockwise, respectively, in FIG. 3 to rewind cords 26 and 28 thereon. Again, the gear train assures uniform displacement of the cord drums and thus uniform rewinding of the cords thereon even if the upward force is applied off center with respect to base rail 16. As the base rail and slats are elevated toward head rail 14, the weight thereof progressively increases to progressively increase the load on motor 10, and the force characteristic of spring member S provides for the return force thereof to progressively increase whereby the manual force required to achieve elevation of the base rail and slats remains substantially uniform. Further in connection with the construction of a venetian blind unit, it will be appreciated from FIG. 2 that the depth or width of head rail 14 is substantiallly reduced by having the spring motor and cord drums longitudinally aligned in comparison with the width which is required when the cord drum and output drum are coaxially arranged as in the prior art. The reduction in width of the head rail which is enabled by the construction of motor 10 advantageously reduces the amount of material required to construct the head rail and adds versatility with respect to locating the venetian blind unit relative to a window frame and window with which the unit is to be associated.

As is well known, the variable force characteristic of the spring member of a spring motor can be obtained in a number of different ways including, for example, varying the thickness of the spring member along the length thereof, varying the width of the spring member along the length thereof, varying both the thickness and width of the spring member along the length thereof, controlling the set and temper of the spring, and varying the radius of curvature of the spring along the length thereof. Preferably, a variable force spring for the spring motor 10 used in conjunction with the elevating and lowering of a venetian blind is obtained by varying the radius of curvature of the spring along the length thereof. As an example of a spring member S for elevating and lowering a venetian blind having a vertical travel of about 72 inches, and with reference to FIGS. 8 and 9, the spring is made from Bartex which is a spring metal having a high carbon content, and the spring has a length of about 100 inches, a thickness t of about 0.0043 inch and a width b of about 0.325 inch.

Further in conjunction with the preferred embodiment, each of the control drum and output drum gears and the idler gear has an outside diameter of about 1.250 inch and a pitch diameter of about 1.187 inch and 38 teeth about the periphery thereof, and each has an axial width of about 0.187 inch. Further, the hubs of the output, storage, and control drums have an axial width of about 0.331 inch, the hub of the control drum has an outer diameter of about 0.600 inch, and the hub of the output drum has an outer diameter of about 0.845 inch. The spring member of the spring motor has a natural inner diameter of about 0.500 inch, and the hub of the storage drum has an outer diameter slightly larger than the natural diameter of the spring member such that the inner end of the spring member firmly grips the drum at less than full extension of the spring member therefrom. Preferably, the drum and gear material is a suitable polymeric material such as nylon.

Figure 10:
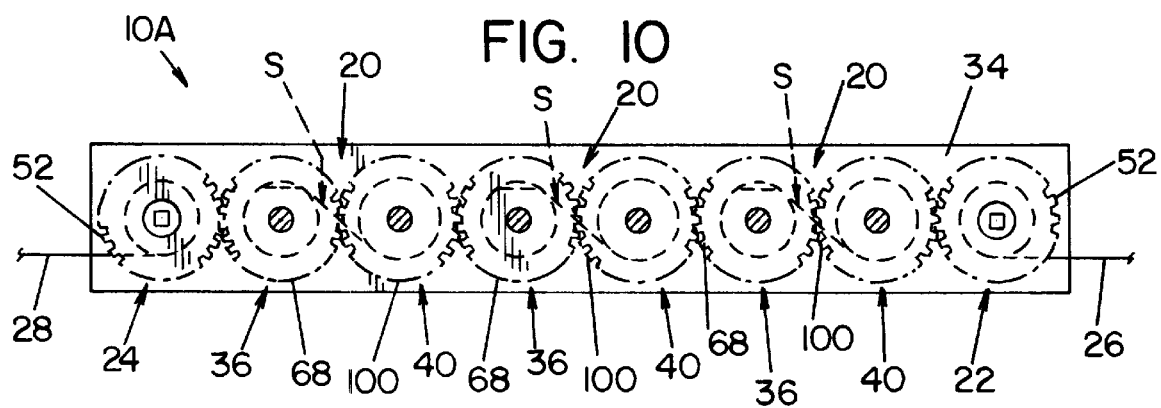
FIG. 10 is a front elevation view of a motor similar to that shown in FIGS. 2–4 with the front support plate removed for clarity and which motor includes a plurality of spring motors between the control drums.

FIG. 10 somewhat schematically illustrates a motor 10A which corresponds substantially to motor 10 described hereinabove with the exception that motor 10A includes a plurality of spring motors 20 in series between the longitudinally opposite ends of the support plates and interconnected for operation in unison. The view in FIG. 10 is a front elevation of the motor with support plate 32 removed. Spring motors 20 in this embodiment correspond structurally to spring motor 20 described hereinabove as do cord drums 22 and 24, and motor 10A can be used, for example, to achieve the elevating and lowering of a venetian blind in the same manner as described hereinabove with regard to FIG. 1 and in connection with a venetian blind unit which would produce a heavier load to be controlled by motor 10A than that to be controlled by motor 10. As will be appreciated from FIG. 10, spring motors 20 are arranged in series between cord drums 22 and 24, whereby storage and output drums 40 and 36 and thus the idler and storage drum gears 100 and 68 are alternately arranged in the direction from cord drum 22 toward cord drum 24. As will be further appreciated from FIG. 10 in conjunction with the preceding description of motor 10, the gears are longitudinally aligned and in meshing interengagement with one another to achieve the desired uniform motion and movement of all of the component parts and thus the uniform application of force in opposite directions with respect to the operation of the motor in conjunction with elevating and lowering a variable load.

While the embodiments thus far described are shown in association with a venetian blind unit providing a variable load supported in suspension relative to the motor by a pair of cords, it will be appreciated from the description thus far that motors 10 and 10A are operable in connection with variable loads or torque other than that provided by a venetian blind and, moreover, are operable in connection with controlling the displacement of a constant or uniform load, wherein spring member S of the spring motor or motors would have a constant spring force characteristic. Moreover, and as shown for example in FIGS. 11–13, longitudinal alignment between a spring member and cord or control drum in accordance with the invention enables a wide variety of selectible positioning between the component parts which lends versatility with respect to designing a motor in accordance with space limitations, load requirements, and/or design parameters or constraints. Thus, as shown for example in FIG. 11, a motor 10B in accordance with the invention includes a spring motor 200 comprising an output drum 202, a storage drum 204, and a spring member 206 operatively connected between the output and storage drums to provide a spring motor therewith. Motor 10B further includes a control drum 208 on which a flexible control line 210 is wound. Output drum 202 includes a gear 212 attached thereto for rotation therewith, and gear 212 is in meshing engagement with a gear 214 attached to control drum 208 for rotation therewith. Output drum 202 is rotatable about an axis 202*a*, storage drum is rotatable about an axis 204*a*, and control drum 208 is rotatable about an axis 208*a*, which axes lie in a common plane 216. In this embodiment, a uniform or variable load applied to line 210 in the downward direction operates to rotate output drum 202 to wind spring member 206 thereonto, and relaxing of the load causes spring member 206 to rewind on storage drum 204 thus to retract the load upwardly. As will be appreciated from FIG. 2, output drum 202, storage drum 204, and control drum 208 are longitudinally aligned, thus providing for motor 10B to be used in a laterally narrow space and in conjunction with controlling the displacement of a load which does not require a pair of control cords such as is required with a venetian blind.

FIG. 12 schematically illustrates a motor 10C which is a modification of motor 10B. In this embodiment, control drum 208 is positioned vertically beneath storage drum 204 of spring motor 200 and is drivingly interengaged with output drum 202 of the spring motor by providing storage drum 204 with an idler gear 218 which is rotatable relative to storage drum 204 about drum axis 204*a*. Axes 202*a* and 204*a* of spring motor 200 lie in a common plane 216, and storage drum axis 204*a* of the spring motor and axis 208*a* of control drum 208 lie in a common plane 220 which is perpendicular to plane 216. As will be appreciated from FIG. 12, a downward force on line 210 rotates control drum gear 214 counter clockwise such that output drum gear 212 is rotated counter clockwise through idler gear 218 to wind spring member 206 on output drum 202. In response to relaxing of the load on line 210, the return force of spring member 206 causes the latter to rewind on storage drum 204 and such rewinding rotates output drum 202 clockwise, whereby control drum 208 is rotated clockwise through idler gear 218 to rewind line 210 on the control drum.

FIG. 13 schematically illustrates a motor 10D which is a modification of motor 10C shown in FIG. 12. In this respect, motor 10D includes a second control drum 222 on which control line 224 is wound and which includes gear 226 secured thereto for rotation therewith about drum axis 222*a*. Gear 226 is in meshing engagement with output drum gear 212 of spring motor 200 and with control drum gear 214 of control drum 208. Drum axes 202*a* and 222*a* lie in a common plane 228 which is parallel to plane 220 and thus perpendicular to plane 216. This arrangement advantageously provides for supporting a load in suspension from control lines 210 and 224 in a structure which is both longitudinally and laterally compact and, in accordance with the invention, advantageously provides for the uniform movement of the component parts and thus balanced elevating and lowering of a load.

As will be appreciated from the embodiments herein illustrated and described, a motor in accordance with the present invention is characterized by at least one spring motor in which the spring member has a constant or variable force characteristic, and a control arrangement in longitudinal alignment with the spring motor and drivingly interengaged with the output drum of the spring motor to provide lateral compactness and versatility with respect to selecting the relative orientation between the spring motor or motors and the components of the control arrangement. As used herein, the term longitudinally is with respect to a direction transverse to the axes of the output and storage drums of a spring motor, and the term laterally is with respect to the direction of the drum axes.

While considerable emphasis has been placed on the structures of the embodiments herein illustrated and described, it will be appreciated that many changes can be made in these embodiment and that other embodiments can be readily devised without departing from the principles of the invention. In this respect, for example, it will be appreciated that the flexible control line wound about the control drum can be other than a cord as described herein and, for example, could be a metal tape or wire. Likewise, it will be appreciated that the spring motor drums and control drum or drums can be rotatably supported between support components other than the support plates described and by support arrangements other than the axles and staked drum supports shown and described herein. Still further, it will be appreciated that the spring member of the spring motor or motors of a motor in accordance with the invention can have a constant or variable force characteristic depending on the character of the load applied to the control cord on the control drum, and that the diameter of the control drum hub on which the control line is wound can be varied to increase or decrease the torque at the control drum in accordance with the force required to provide the desired control for displacement of a given load attached to the control line. It will likewise appreciated that other dimensional variations are possible, and that other orientations of the control drum or drums relative to the spring motor or motors can be made. With regard in particular to the latter, it will be appreciated that, for example, one or both of the axes of the control drums in the embodiment of FIG. 13 can be located anywhere between the positions shown and positions in which the axes would be coplanar with the spring motor drum axes. As a further modification of the latter embodiment, and the embodiment of FIG. 12, the axes of the control drums can be located above the spring motor drum axes rather than below and, again, in any position between positions in which the control drum axes lie in planes 220 and 228 and positions in which the latter axes are coplanar with plane 216. It will also be appreciated that such selective orientation of the control drum or drums relative to a spring motor or spring motors is applicable to the motor illustrated in FIGS. 1–5 and FIG. 10 of the drawing.

Still further, while it is preferred to drivingly interengage the component parts of a spring motor and control drum by a gear train arrangement as herein illustrated and described, it will be appreciated that it would be possible to otherwise drivingly interengage the component parts, such as by providing frictionally interengaging wheels in place of the gears or an endless belt interengagement between pulley or sprocket wheels associated with the spring motor and control drums. Finally, it will be appreciated that the length of the spring member of the spring motor and the length of the flexible control line wound on the control drum can vary depending on the distance to which the load is to be displaced in the direction away from the motor. However, it is to be understood that in accordance with the invention the load displacement is such that the control drum and output drum of the spring motor undergo multiple revolutions in connection with displacing the load in opposite directions relative thereto. The foregoing and other modifications of the embodiments herein illustrated and described as well as other embodiments of the invention will be obvious to those skilled in the art from the disclosure herein, whereby it is to be distinctly understood that the foregoing description is to be interpreted merely as illustrative of the invention and not as a limitation.

Having thus described the invention, it is claimed:

1. A motor comprising spring storage drum means having a first axis, an output drum rotatable about a second axis parallel to and spaced from said first axis, a spring member coiled on said storage drum means coaxial with said first axis and having a first end on said storage drum means and a free end connected to said output drum for rotation of said output drum in one direction about said second axis to wind said spring member thereon from said storage drum means and for said spring member to bias said output drum in the direction opposite said one direction to rewind said spring member on said storage drum means, said spring member having laterally opposite sides transverse to said first and second axes, said output drum including output drum drive means adjacent one of said sides of said spring member for rotating said output drum in said one direction about said second axis for winding said spring member on said output drum, control means laterally aligned with said drive means, and means interengaging said control means and said drive means for said control means to control rotation of said output drum in said one and opposite directions.

2. A motor according to claim 1, wherein said control means is rotatable about a third axis parallel to and spaced from said second axis.

3. A motor according to claim 2, wherein said means interengaging said control means and said drive means includes gear means.

4. A motor according to claim 2, wherein said first, second, and third axes lie in a common plane.

5. A motor according to claim 2, wherein said first and second axes lie in a common plane and said third axis is spaced from said plane.

6. A motor according to claim 2, and means supporting said storage drum means, said output drum and said control means including parallel spaced apart support plates, said storage drum means, output drum and control means being between said support plates, and said first, second, and third axes being transverse thereto.

7. A motor according to claim 2, wherein said control means is first control means, and second control means laterally aligned with said drive means and rotatable about an axis parallel to and spaced from each said first, second, and third axis, and means interengaging said second control means with said drive means for said second control means to control rotation of said output drum in said one and opposite directions.

8. A motor according to claim 1, wherein said means interengaging said control means and said drive means includes gear means.

9. A motor according to claim 8, wherein said gear means includes a drive gear on said output drum providing said drive means and a control gear in meshing engagement with said drive gear and providing said control means.

10. A motor according to claim 9, wherein said gear means further includes an idler gear rotatable about said first axis relative to said storage drum means, said control gear being a first control gear, and a second control gear in meshing engagement with said idler gear for controlling rotation of said output drum through said idler gear.

11. A motor according to claim 9, wherein said control gear is rotatable about a third axis parallel to said first and second axes and wherein said control means further includes a control drum connected to said control gear for rotation therewith, and flexible line means wound on said control drum for controlling rotation of said control drum in opposite directions about said third axis.

12. A motor according to claim 11, wherein said gear means further includes an idler gear rotatable about said first axis relative to said storage drum means, said control gear being a first control gear, and a second control gear in meshing engagement with said idler gear, said control drum being a first control drum connected to said first control gear, and a second control drum connected to said second control gear for rotation therewith about a fourth axis parallel to said first, second, and third axes, and flexible line means wound on said second control drum for controlling rotation of said second control drum in opposite directions about said fourth axis.

13. A motor according to claim 8, wherein said gear means includes a drive gear on said output drum providing said drive means, an idler gear rotatable about said first axis relative to said storage drum means, and a control gear rotatable about a third axis parallel to said first and second axes, said control gear being in meshing engagement with said idler gear and providing said control means.

14. A motor according to claim 13, wherein said control means further includes a control drum connected to said control gear for rotation therewith, and flexible line means wound on said control drum for controlling rotation of said control drum in opposite directions about said third axis.

15. A motor according to claim 1, wherein said control means includes a rotatable control drum laterally aligned with said output and storage drums, and flexible line means wound on said control drum for controlling rotation thereof.

16. A motor according to claim 1, wherein said storage drum means, output drum and spring member provide a first spring motor, and at least one additional spring motor drivingly interengaged with said first spring motor to operate in unison therewith.

17. A motor according to claim 1, wherein said storage drum means, output drum and spring member provide a first spring motor, and a plurality of additional spring motors corresponding structurally to said first spring motor, and means drivingly interconnecting said additional spring motors with one another and with said first spring motor for said additional spring motors to operate in unison with said first spring motor.

18. A motor according to claim 17, wherein said plurality of additional spring motors includes a last spring motor, said control means being first control means, second control means laterally aligned with the drive means of said last spring motor, and said means drivingly interconnecting said additional spring motors and said first spring motor including means drivingly interengaging said second control means and the drive means of said last spring motor.

19. A motor according to claim 1, wherein said control means includes a control drum rotatable about a third axis parallel to and spaced from said first and second axes, said means interengaging said control means and said drive means including intermeshing gear means on said control drum and said output drum.

20. A motor according to claim 19, wherein each of said output and control drums includes a flange transverse to the axis thereof, said intermeshing gear means including gear teeth on each said flange.

21. A motor according to claim 19, wherein said control drum is a first control drum, an idler gear rotatable about said first axis relative to said storage drum means, said idler gear intermeshing with said gear means on said first control drum, and a second control drum rotatable about a fourth axis parallel to and spaced from said first axis and including a gear intermeshing with said idler gear.

22. A motor according to claim 21, and flexible cord means wound on each said first and second control drum for controlling rotation thereof.

23. A motor according to claim 21, wherein each of said output and said first and second control drums has a flange transverse to the axis thereof, said intermeshing gear means including gear teeth on each said flange.

24. A motor according to claim 23, and flexible cord means wound on each said first and second control drum for controlling rotation thereof.

25. A motor comprising, a pair of parallel spaced apart support plates, a spring motor between said plates, said spring motor including storage drum means mounted between said plates and having a first axis transverse to said plates, an output drum mounted between said plates for rotation about a second axis parallel to and spaced from said first axis, and a return spring member operatively connecting said storage drum means and said output drum, drum gear means coaxial with said second axis and connected to said output drum for rotation therewith, idler gear means coaxial with said first axis and rotatable relative to said storage drum means, said drum gear means and idler gear means being in meshing interengagement, and control gear means mounted between said plates for rotation about a third axis parallel to and spaced from said first and second axes, said control gear means being in meshing interengagement with one of said drum gear means and idler gear means for controlling rotation of said output drum therethrough.

26. A motor according to claim 25, wherein said control gear means is first control gear means, and second control gear means mounted between said support plates for rotation about a fourth axis parallel to and spaced apart from said first, second, and third axes, said second control gear means being in meshing interengagement with the other of said drum gear means and idler gear means for controlling rotation of said output drum therethrough.

27. A motor according to claim 26, wherein said first, second, third, and fourth axes are in a common plane.

28. A motor according to claim 26, wherein each said first and second control gear means includes a control drum coaxial with the corresponding one of said third and fourth axes, and flexible line means wound on said control drum for controlling rotation thereof.

29. A motor according to claim 28, wherein each said first and second control drum and said output drum includes a flange adjacent the inner side of one of said support plates, each said flange having gear teeth thereon providing said drum gear means and said control gear means.

30. A motor according to claim 29, wherein said first, second, third, and fourth axes are in a common plane.

31. A motor according to claim 25, wherein said spring motor is a first spring motor, and at least one additional spring motor between said support plates in series with said first spring motor and corresponding structurally to said first spring motor, the idler gear means of one of said first and said at least one additional spring motor being in meshing interengagement with the drum gear means of the other of said first and said at least one additional spring motor for said first and said at least one additional spring motor to operate in unison.

32. A motor according to claim 31, wherein the first and second axes of said first and at least one additional spring motor lie in a common plane.

33. A motor according to claim 31, wherein said control gear means is first control gear means, and second control gear means mounted between said support plates for rotation about a fourth axis parallel to and spaced apart from said third axis, said first control gear means being in meshing interengagement with one of said drum gear means and said idler gear means of said first spring motor, and said second control gear means being in meshing interengagement with one of said drum gear means and idler gear means of said at least one additional spring motors for said first and second control gear means to control rotation of the output drums of said first and at least one additional spring motor.

34. A motor according to claim 33, wherein the first and second axes of said first and said at least one additional spring motor and said third and fourth axes lie in a common plane.

35. A motor according to claim 33, wherein each said first and second control gear means includes a control drum coaxial with the corresponding one of said third and fourth axes, and flexible line means wound on said control drum for controlling rotation thereof.

36. A motor according to claim 35, wherein each said first and second control drum and the output drums of said first and said at least one additional spring motor includes a flange adjacent the inner side of one of said support plates, each said flange having gear teeth thereon providing said drum gear means and said control gear means.

37. A motor according to claim 36, wherein said first control gear means is in meshing interengagement with said drum gear means of said first spring motor and said second control gear means is in meshing interengagement with said idler gear means of said at least one additional spring motor.

38. A motor according to claim 37, wherein the first and second axes of said first and said at least one additional spring motor and said third and fourth axes lie in a common plane.

39. A motor comprising, support means including a pair of parallel spaced apart support plates having opposite ends, a plurality of spring motors in series between said ends, each said motor including storage drum means and an output drum arranged sequentially in the direction from one of said opposite ends toward the other and a return spring member operatively connecting said storage drum means and said output drum, said storage drum means and output drum being mounted between said support plates and having spaced apart axes transverse to said plates, at least said output drum being rotatable about its axis, rotatable gear train means drivingly interconnecting said plurality of spring motors for operation in unison, and control gear means in meshing interengagement with at least one of the gears in said gear train means for controlling rotation thereof.

40. A motor according to claim 39, wherein said gear train means includes an output gear on and rotatable with the output drum of each of said plurality of spring motors, and an idler gear coaxial with and rotatable relative to the storage drum means of each of said plurality of spring motors.

41. A motor according to claim 40, wherein said plurality of spring motors includes a first spring motor and a last spring motor with respect to a direction from one of said opposite ends of said support plates toward the other, one of the output and idler gears of said first spring motor facing said one end and the other of the output and idler gears of said last spring motor facing said other end, and said control gear means including first and second control gears in meshing interengagement respectively with said one gear of said first spring motor and said other gear of said last spring motor.

42. A motor according to claim 41, wherein the axes of said storage drum means and said output drum of said plurality of spring motors lie in a common plane, said first and second control gears being rotatable about axes transverse to said support plates and lying in said plane.

43. A motor according to claim 41, wherein said first and second control gears are respectively connected to first and second control drums for rotation therewith respectively about first and second axes transverse to said support plates, each said first and second control drum and the output drums of said plurality of spring motors including a flange adjacent the inner side of one of said support plates, each said flange having gear teeth thereon providing said first and second control gears and the output gears of said plurality of spring motors.

44. A motor according to claim 43, and flexible line means wound on each said first and second control drum for controlling rotation thereof.

45. A motor according to claim 44, wherein the axes of said storage drum means and said output drum of said plurality of spring motors and said first and second axes lie in a common plane.

* * * * *